Jan. 3, 1933.   G. J. PATITZ ET AL   1,892,705
AUTOMATIC MACHINE FOR CUTTING PLASTIC PRODUCTS
Filed Nov. 19, 1931   8 Sheets-Sheet 1

Fig.1

INVENTOR
Gerhardt J Patitz
BY Ralph W. Bunge
Watson, Bristol, Johnson & Leavenworth
ATTORNEYS

Jan. 3, 1933. G. J. PATITZ ET AL 1,892,705
AUTOMATIC MACHINE FOR CUTTING PLASTIC PRODUCTS
Filed Nov. 19, 1931 8 Sheets-Sheet 4

INVENTOR
Gerhardt J. Patitz
BY Ralph W. Bunge
Watson, Bristol, Johnson & Leavenworth
ATTORNEYS

Jan. 3, 1933.  G. J. PATITZ ET AL  1,892,705
AUTOMATIC MACHINE FOR CUTTING PLASTIC PRODUCTS
Filed Nov. 19, 1931   8 Sheets-Sheet 6

INVENTOR
BY
ATTORNEYS

Jan. 3, 1933.  G. J. PATITZ ET AL  1,892,705
AUTOMATIC MACHINE FOR CUTTING PLASTIC PRODUCTS
Filed Nov. 19, 1931   8 Sheets-Sheet 8

INVENTOR
Gerhardt J. Patitz
BY Ralph W. Bunge
Watson, Bristol, Johnson & Leavenworth
ATTORNEYS Patented Jan. 3, 1933

1,892,705

UNITED STATES PATENT OFFICE

GERHARDT J. PATITZ, OF PEEKSKILL, AND RALPH W. BUNGE, OF BRONXVILLE, NEW YORK, ASSIGNORS TO STANDARD BRANDS INCORPORATED, OF NEW YORK, N. Y., A CORPORATION OF DELAWARE

AUTOMATIC MACHINE FOR CUTTING PLASTIC PRODUCTS

Application filed November 19, 1931. Serial No. 576,100.

This invention relates to automatic machines for cutting plastic products and, more particularly, to such machines adapted for automatic operation in forming cakes of plastic materials from an extruded bar thereof, such as, for example, compressed yeast, butter or the like.

A general object of the invention is the provision of a machine capable of automatic operation in the forming of cakes from a mass of a plastic material and in the delivering of such cakes from the forming mechanism to a delivery or wrapping table.

A specific object of the invention is the provision of such a machine wherein the cakes are formed by a biased cutter periodically operated to cut a portion from a moving bar of the plastic material, the operation of the cutter operating mechanism being controlled by the movement of the extruded bar.

Another object of the invention is the provision of mechanism to operate the cutter in such a manner as to make it double-acting, that is, to cause the cutter to cut a portion from a moving bar of plastic material when moved to one position and to cut a similar portion from the bar upon the return movement.

A still further object of the invention is the provision in such a machine of delivering mechanism which carries each cake as it is formed away from the cutting mechanism, the operation of the delivering mechanism being initiated by the mechanism which operates the cutter.

An additional object of the invention is the provision in such a machine of a biased rotary member which upon partial rotation thereof operates the cutter and which together with the delivering mechanism is controlled in operation by mechanism actuated by the movement of the bar of plastic material.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which.

The mechanism of the present machine is adapted automatically to cut cakes from a bar of plastic material continuously extruded from a nozzle, transfer the resultant cakes to a receiving table in a desired position and move the positioned cakes across the table. Briefly described, the machine comprises a nozzle adapted to extrude a continuous bar of plastic material, a frame upon which the various operating mechanisms are mounted and a motor driven shaft. A platform is movably mounted upon this frame below the line of the travel of the bar of plastic material and a biased reciprocating cutter is associated with this platform. An intercepting plate is mounted upon this platform in the line of travel of the bar of plastic material to move the platform longitudinally, and this plate is associated with mechanism adapted to move it out of the intercepting position after a cake has been cut from the bar of plastic material. The platform, upon movement is adapted to operate control mechanism which periodically releases a biased rotary member adapted to operate the cutter and periodically holds it in a stationary position such that the spring associated with the cutter operating rotary member will be rewound for the next operation. In addition, this control mechanism operates a clutch on the motor driven shaft periodically to drive a biased rotary barrel cam mounted adjacent this clutch. The barrel cam is adapted to reciprocate an arm associated with a transfer carriage adapted to engage the formed cake, turn the latter through an angle of approximately 90° and transfer it to a receiving table. This barrel cam additionally operates mechanism which periodically raises and lowers a movable portion of the receiving table. The arm operated by the barrel cam is also adapted to operate segmental gears to reciprocate the movable portion of the table so that the latter will have a four-movement travel, that is, (1) upwardly into engagement with cakes disposed on the table, (2) forwardly to move the cakes across the table, (3) downwardly to disengage the movable portion of the table from the cakes and (4) rearwardly to reposition the movable portion of the table and the intercepting plate for another cycle of operation. A more detailed description of the various parts of the operating mechanism and their operations will be given below in referring to the drawings in which like numerals refer to like parts throughout.

Figure 1:
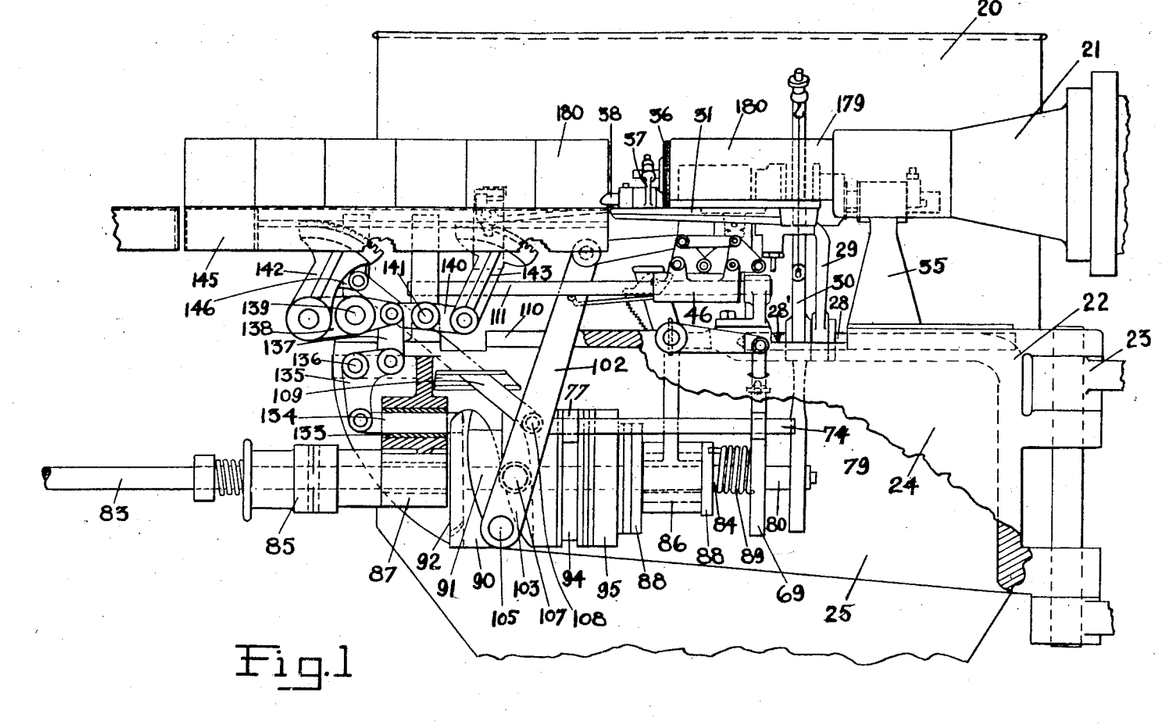
Fig. 1 is a side elevational view of the machine made in accordance with the present invention, with parts broken away;
Figure 2:
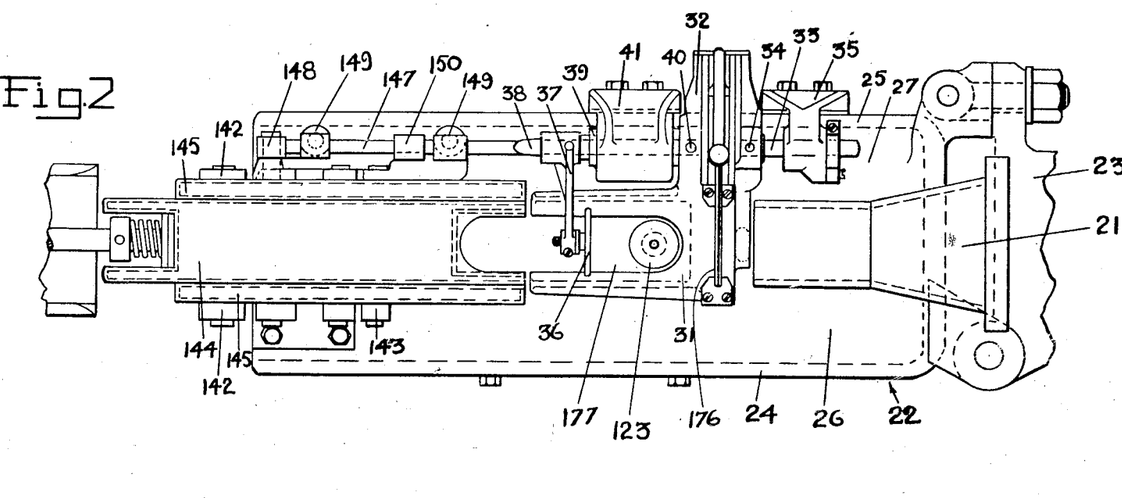
Fig. 2 is a top plan view of the machine.
Figure 3:
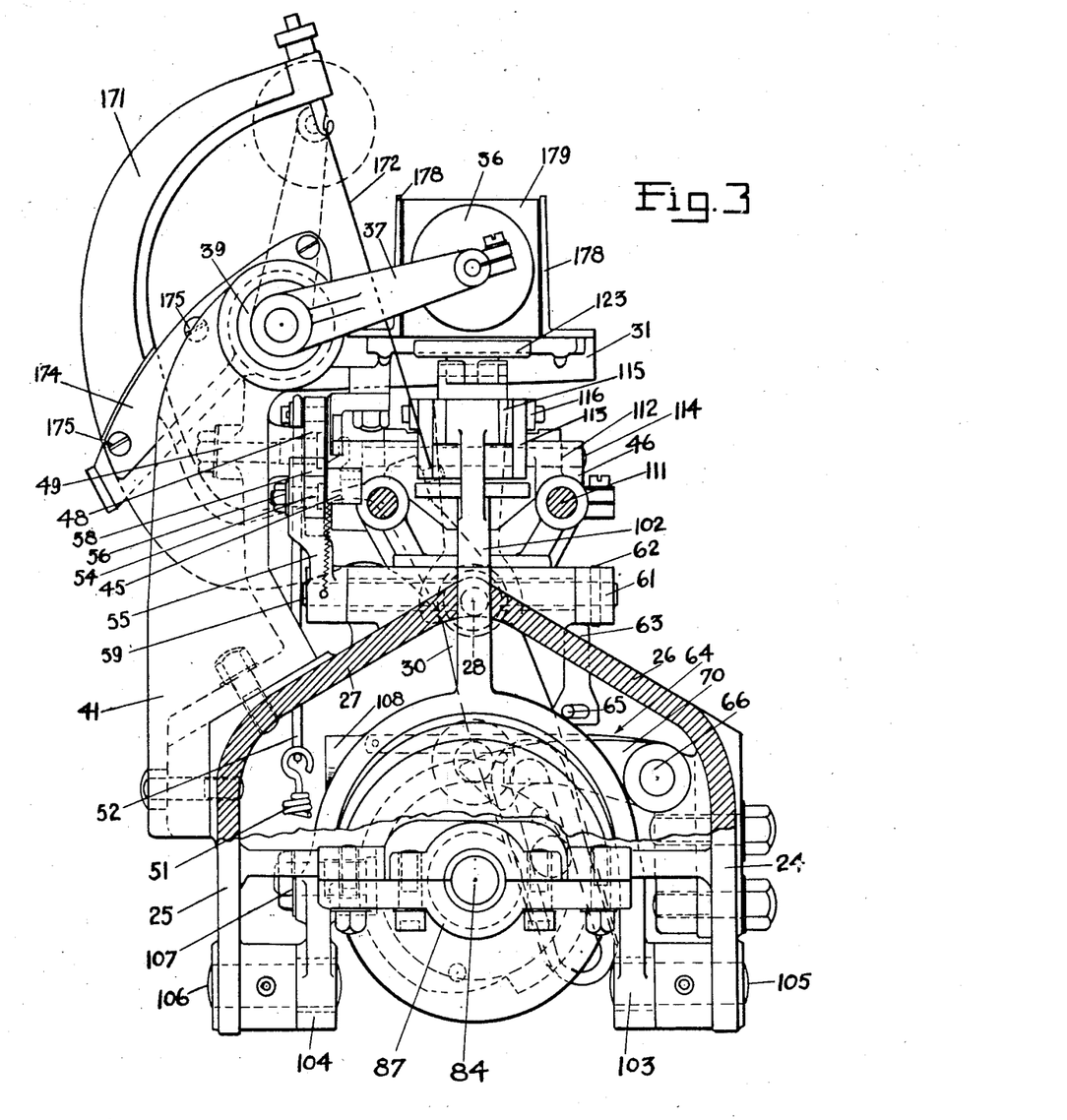
Fig. 3 is an enlarged end view of the machine, with parts broken away.

As is shown in Fig. 1, the operating mechanism of the machine is disposed between a pair of shield plates 20 adapted to prevent scattering of small disengaged particles of the plastic material and to transfer these particles to a collecting receptacle (not shown). The operating mechanism includes a nozzle 21 through which the plastic material is adapted to be extruded by compression to form a bar thereof of any desired shape and a fixed frame 22 suitably supported at 23, as shown in Figs. 1 and 2. This frame 22 is provided with vertically extending, spaced skirts 24 and 25 which merge with converging webs 26 and 27 forming a longitudinally extending arch, as shown in Fig. 3. A horizontally extending shaft 28 is fixedly mounted in the rear portion of this arch in line with the juncture of 26 and 27 and a portion of the arch adjacent thereto is cut away at 28' to allow the platform supporting arm 29 and the cutter arm 30 to be mounted thereon in a manner so that the cutter arm can rotate thereon and move longitudinally together with the supporting arm thereon.

The platform supporting arm 29 supports one side of the platform 31 which is provided with an integral laterally projecting cutter guide support 32 fixed to the shaft 33 by the pin 34. The shaft 33 is slidably mounted in the head of the supporting member 35 which is fixed to the frame 22 as shown in Figs. 1 and 2. A short longitudinal movement of the platform 31 is possible since the platform supporting arm 29 and cutter arm 30 are movable longitudinally on the shaft 28 and the shaft 33, fixed to the cutter guide support 32, is slidably mounted in the member 35, the cutter guide 32 additionally being of a width less than the distance between the supporting member 35 and an adjacent supporting member 41, as shown in Fig. 2.

Figures 6, 17:
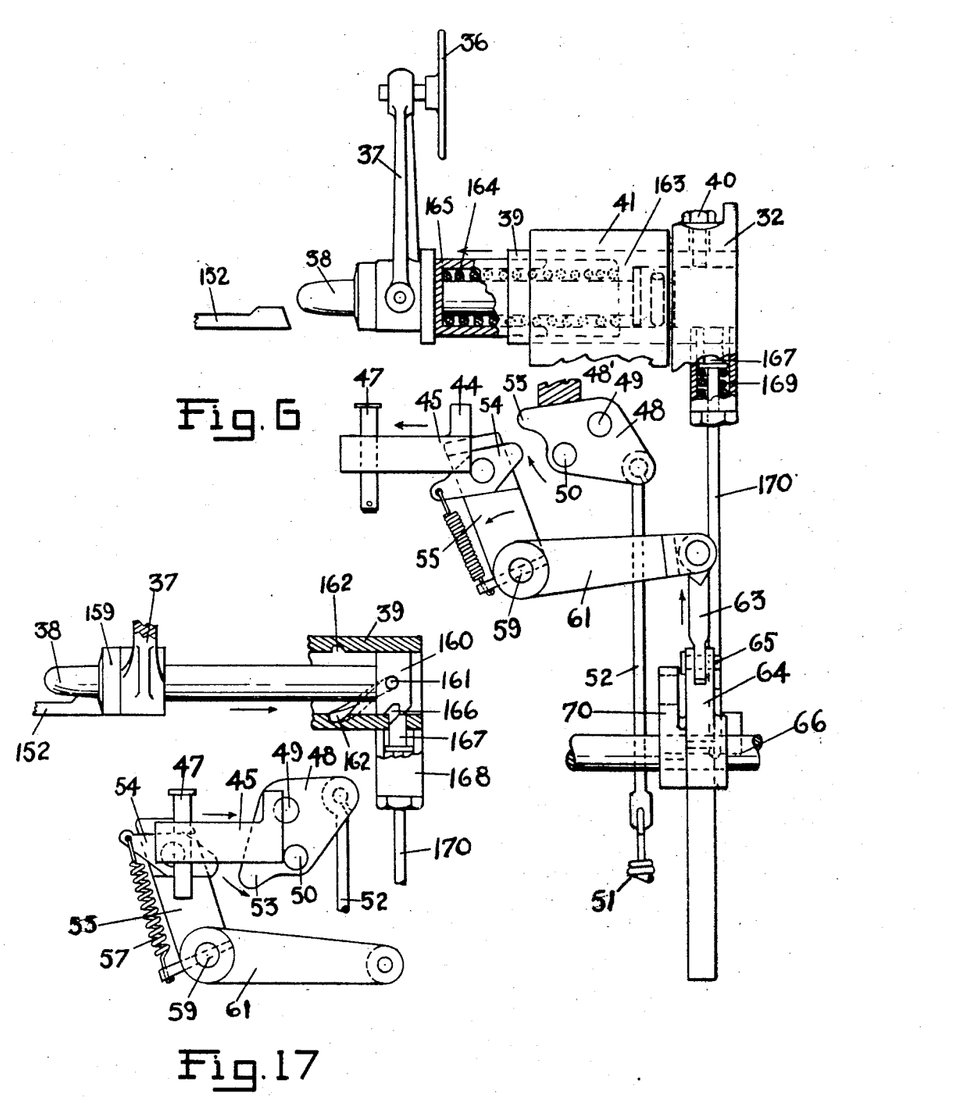
Fig. 6 is a detailed elevational view of the control mechanism shown in Fig. 4, with parts broken away, showing the position of various parts thereof after operation has been started.
Fig. 17 is an elevational view of part of the control mechanism with parts broken away showing the return of this mechanism to the initial position.
Figure 7:
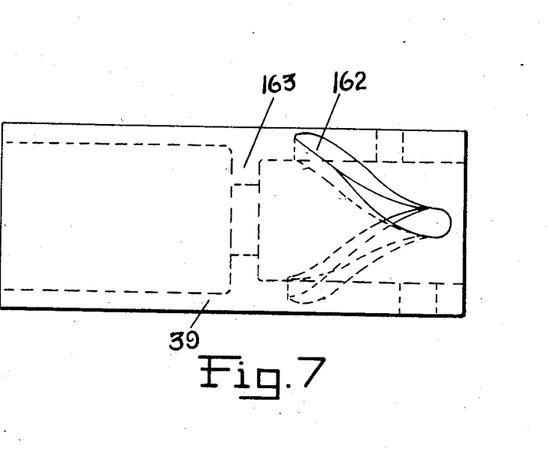
Fig. 7 is an enlarged elevational view of the cam sleeve adapted to move the intercepting plate out of the engaging position with the bar of plastic product;

An intercepting plate 36 is mounted within the path of travel of the bar of plastic material as shown in Figs. 1, 2, 3 and 4. This intercepting plate 36 is supported in any suitable manner by an arm 37 secured to a biased stop plunger 38 mounted in a cam sleeve 39 fixed in the cutter guide support 32 by means of the screw 40, as shown in Fig. 6. This sleeve 39 is slidably mounted in the head of the supporting member 41 to allow the slight longitudinal movement of the platform 31 mentioned above produced by pressure of the extruded bar of plastic material upon the intercepting plate 36.

Figures 4, 5, 8:
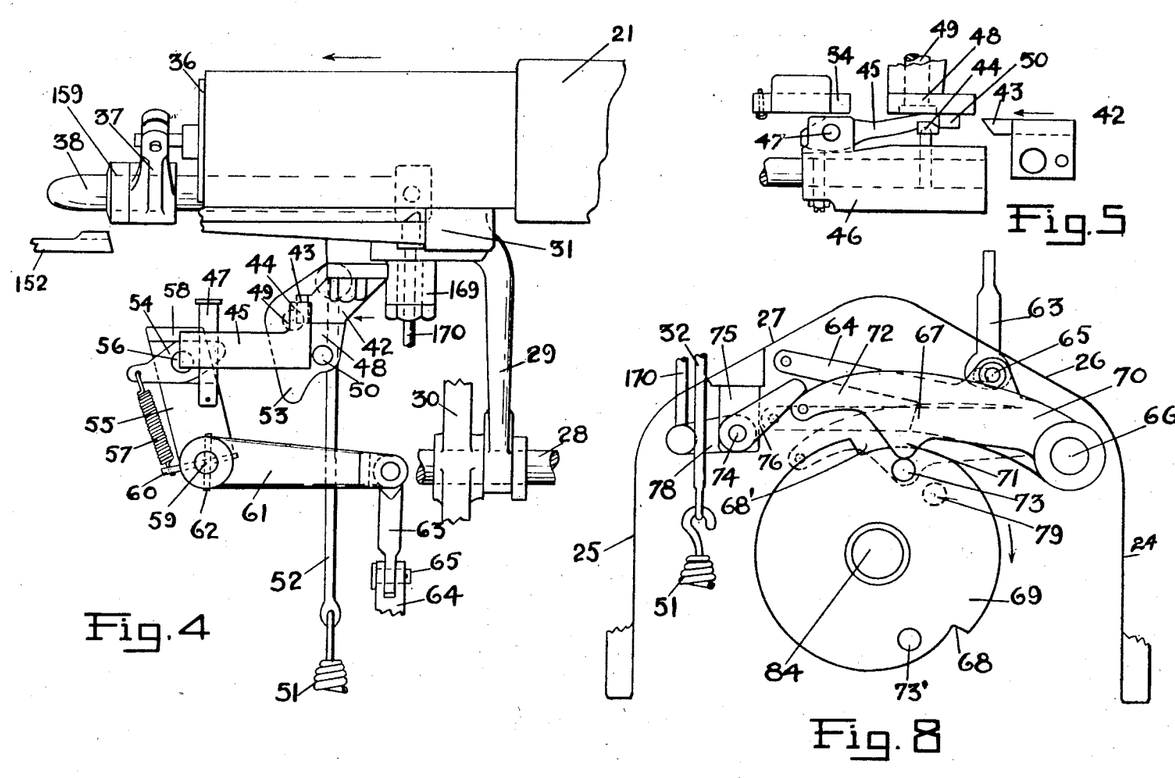
Fig. 4 is a detailed elevational view of a part of the control mechanism, with parts broken away, showing the position of some of the parts thereof just prior to the operation initiated by the projecting bar of plastic product.
Fig. 5 is a detailed top view of a portion of the control mechanism depicted in Fig. 4.
Fig. 8 is a detailed end elevational view, with parts broken away, of the parts of the control mechanism operated by those depicted in Fig. 4 together with the rotary member adapted to operate the cutter arm;

A trip finger 42 is fixed to the underside of the cutter guide support 32, as shown in Fig. 4. This finger 42 is provided with a bevelled nose 43 adapted to engage behind a projecting portion 44 of a pivoted arm 45 mounted on the transfer carriage 46 by pin 47 when the platform 31 is moved longitudinally as described above.

A striking plate 48 is pivoted to the supporting member 41 by a pin 49 as shown in Figs. 3, 4, 5 and 6, and carries a stop pin 50 on the inner face thereof adapted to be engaged by the end of a pivoted arm 45 thereby resisting the tendency of the spring 51 to rotate this plate in a clockwise direction about the pin 49. This spring 51 is fixed to the frame in any suitable manner and is connected by a rod 52 to the striking plate 48. This plate is additionally provided with a striking nose 53 adapted to engage the nose of the trip trigger 54 pivoted on the trip arm 55 by the pin 56. This trip trigger 54 is normally held in the position shown in Fig. 4 by the spring 57 so that the upper face thereof engages against the overhanging portion 58 of the trip arm 55. The trip arm 55 is fixed to a shaft 59 in any suitable manner, such as, for example, by the pin 60 which, in the embodiment shown, also serves as an anchor for the end of the spring 57. A horizontally extending arm 61 is additionally fixed to the shaft 59 by any suitable means, such as, for example, by the pin 62 as shown in Figs. 3 and 4. Pivotally mounted on the end of this arm 61 is a link member 63 pivoted to a locking pawl 64 by a pin 65 as shown in Figs. 3, 4, 6 and 8.

The locking pawl 64 is pivotally mounted on the inside of the skirt 24 by a shaft 66 as shown in Figs. 3 and 8 and is provided with a locking projection 67 shown in dotted lines in Fig. 8. The locking projection is adapted to engage with the face of the notch 68 on the rotary member 69 to hold the latter in a normally locked position by the aid of a spring (not shown) fixed to the end of the locking pawl 64.

A drive release pawl 70 is additionally mounted on this shaft 66 and is provided with a downwardly projecting nose 71 and a laterally extending arm 72 connected to a spring (not shown) fixed to the frame, normally to hold the pawl 70 in the position indicated by the dotted lines in Fig. 8. This pawl is positioned so that its nose 71 will lie in the path of a pin 73 fixed to the rotary member 69.

A pawl shaft 74 is supported from the web 27 by any suitable means, such as, for example, by the integrally formed member 74 shown in Fig. 8. This pawl shaft 74 is mounted so as to be rotatable in the supporting member 75 and is provided with a trip finger 76 fixed thereto and is positioned so that it will be engaged by the laterally extending arm 72 of the drive release pawl 70. The pawl shaft 74 is additionally provided with a clutch pawl 77 as shown in Fig. 1 and a lock release arm 78 as shown in Fig. 8 for purposes to be set forth below.

A cutter arm driving pin 79 is fixed to the rotary member 69 on the face opposite to that on which is mounted the pin 73 as shown in Figs. 1 and 8. A rotatable sleeve 80 is mounted on pin 79 and is adapted to engage in the elongated slot 81 of the extending arm 82 of the cutter arm 30 (see Fig. 9).

Figure 10:
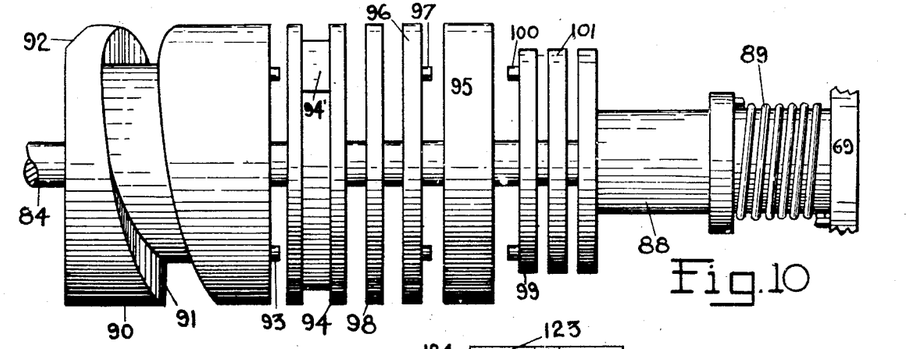
Fig. 10 is an extended side elevational view of the cutter operating rotary member, the clutch mechanism, the barrel cam and associated members mounted on the motor driven shaft.

A motor driven shaft 83 is coupled to a cam shaft 84, preferably, by a spring-pressed clutch member 85 as shown in Fig. 1. The cam shaft 84 is supported on the frame by centrally disposed bearing members 86 and 87 respectively. The rotary member 69 is fixed to this shaft beyond the bearing support 86 as shown in Fig. 1 and a collar 88 surrounding the cam shaft 84 is rotatably mounted in the bearing member 86. A helical spring 89 surrounding the shaft 84 is disposed between the collar 88 and the rotary member 69 with one end of the spring 89 fixed to the rotary member 69 and the other end of the spring fixed to the collar 88 as shown in Figs. 1 and 10.

Figure 11:
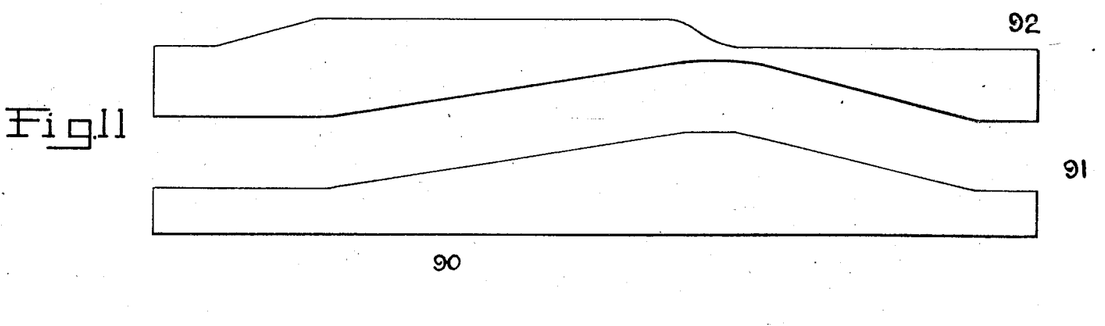
Fig. 11 is a lay out of the barrel cam.
Figures 12, 14:
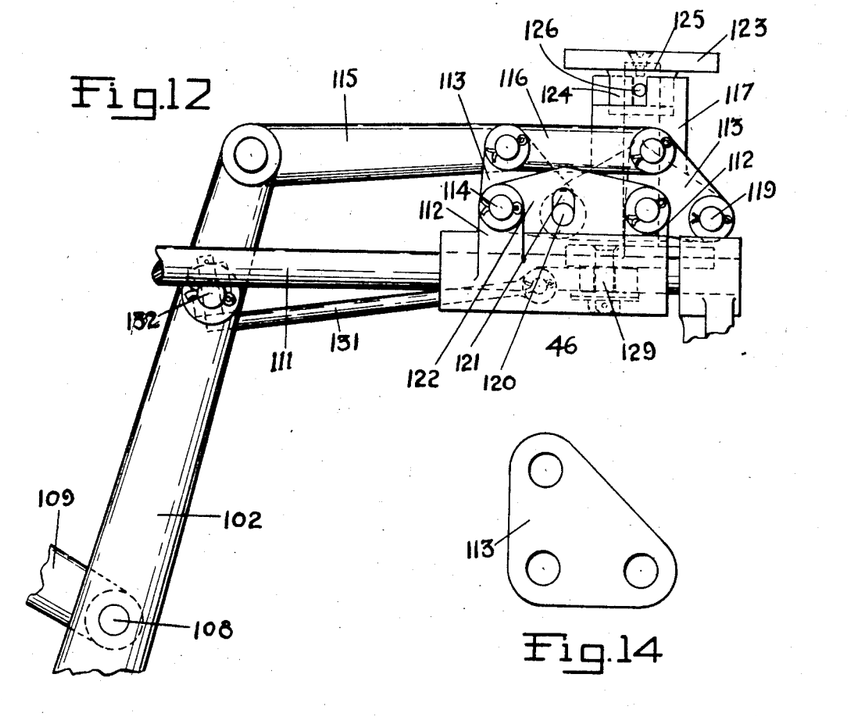
Fig. 12 is an enlarged elevational view of the cake transfer mechanism together with a portion of the operating arm in the initial position.
Fig. 14 is a detailed elevational view of one of the cradle operating bell crank members.
Figure 13:
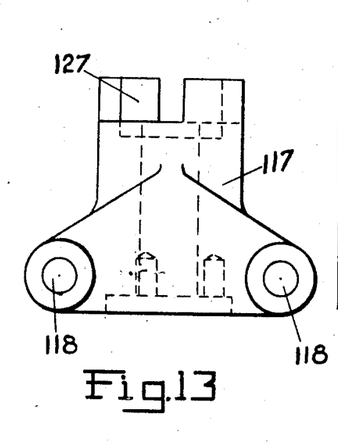
Fig. 13 is an enlarged elevational view of the transfer disc cradle forming a part of the transfer mechanism;

A biased barrel cam 90 is mounted on the cam shaft 84 between the bearing members 86 and 87 in a manner such that the cam 90 will not be driven by the shaft 84. This barrel cam 90 is provided with a circumferentially extending cam groove or track 91 and an additional cam face 92 adjacent the bearing member 87 as shown in Fig. 1. The development of this barrel cam is shown in Fig. 11 to indicate more clearly the cam faces provided thereon. A plurality of studs 93 are mounted on the inner vertical face of this barrel cam as shown in Fig. 10 and are adapted to engage in recesses in one vertical face of a stop disc 94. This stop disc is provided with a circumferentially extending groove shaped to provide a clutch pawl stop 94′ adapted to be engaged by the pawl 77 mounted on the pawl shaft 74.

The collar 95 is fixed to the shaft 84 between collar 88 and the stop disc 94. A friction plate 96 is mounted between the collar 95 and the stop disc 94 and is provided with a plurality of studs 97 adapted to engage in recesses in the adjacent face of the collar 95. A friction disc 98 of any suitable material, such as, for example, fiber is preferably disposed between the friction plate 96 and the stop disc 94. A second friction plate 99 is disposed between the collars 88 and 95 and is provided with a plurality of studs 100 adapted to engage in suitable recesses in the face of the collar 95 and a second friction disc 101 is preferably disposed between the collar 88 and the friction plate 99. This mechanism provides for the rotation of the collar 88 through the friction members 99 and 101 from the collar 95 such that when the rotary member 69 is held in a stationary position by the locking pawl 64 the spring 89 will be wound up to provide means for driving the biased rotary member 69 when released by operation of the locking pawl 64. This clutch mechanism additionally operates to rotate the barrel cam 90 periodically when the stop disc 94 is released by the clutch pawl 77.

An operating arm 102 is provided with a pair of branch arms 103 and 104 adapted to straddle the barrel cam 90. The ends of these arms 103 and 104 are pivoted to the frame skirts 24 and 25 respectively in any suitable manner, such as, for example, by the pins 105 and 106 respectively, as is shown in Fig. 3. The branch arm 104 is provided with a cam follower 107 positioned in the circumferentially extending cam track 91 and a pin 108 adapted pivotally to secure the segmental gear operating arm 109 thereto.

The operating arm 102 projects through a centrally disposed slot 110 in the arch of the frame 22 between a pair of horizontally disposed rods 111 mounted upon the frame in any suitable manner as shown in Figs. 1, 3, 12 and 16. The transfer carriage 46 is mounted for reciprocating motion upon the rods 111 and is provided with two pairs of vertically extending supports 112. A pair of spaced apart bell crank members 113 are suitably supported between each pair of supports 112 such as, for example, by the pin 114 such that they may be rotated thereabout through a limited angle. The operating arm 102 is linked to the nearest pair of bell crank members 113 by a pivoted arm 115, and the other pair of bell crank members 113 are linked to the first mentioned pair of bell crank members by a pair of links 116.

A cradle 117 provided with an enlarged base having a pair of spaced apart laterally extending holes 118 formed therein is mounted between the two pairs of bell crank members 113 by pins 119 and 120 mounted in the holes 118. The pin 120 is of a length such that the ends thereof will engage in elongated slots 121 in the bridging skirts 122 formed as an integral part of the supports 112 on each side of the carriage. A rotatable transfer disc 123 is mounted on top of this cradle by a seating portion 124 seated within a socket in the upper end of the cradle. This transfer disc is mounted on the end of a vertical shaft 125 in any suitable manner, such as, for example, by the counter-sunk screw indicated in dotted lines in Figs. 12 and 16. The seat 124 and the shaft 125 are transfixed by a stop pin 126. The edge of the socket in the upper end of the cradle 117 is cut away at diametrically opposed points 127 to allow a limited rotation of the transfer disc 123 and the associated stop pin 126. Each cut away portion of the edge of the socket represents about one quarter thereof to allow the transfer disc 123 to rotate through an angle of about 90°. This disc is rotated by the shaft 125 which is fixed to a lower disc 128 shown in Figs. 12, 15 and 16.

Figures 15, 16:
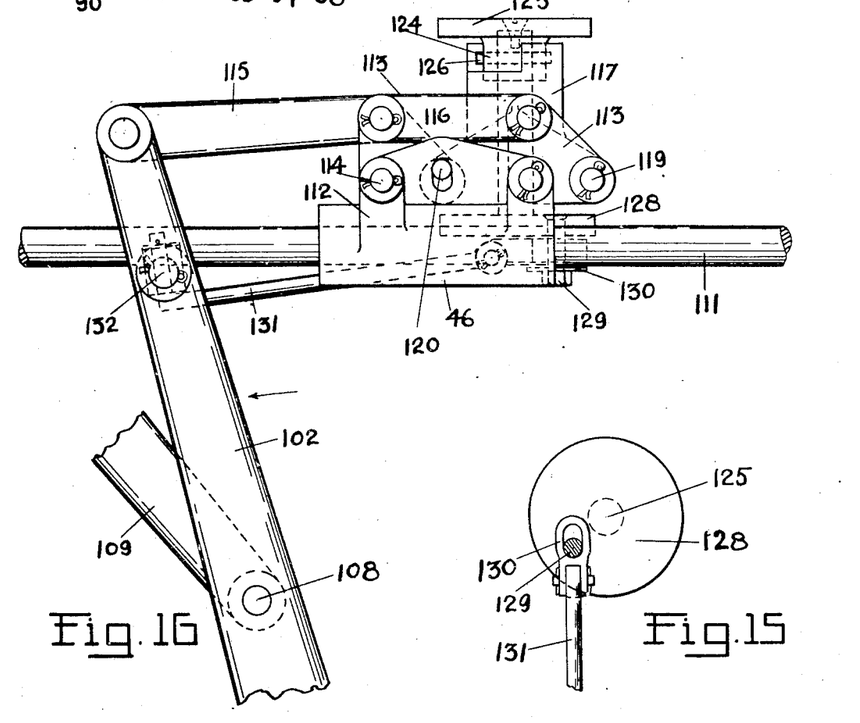
Fig. 15 is a detailed bottom view of the transfer disc operating mechanism with parts broken away.
Fig. 16 is an enlarged elevational view of the cake transfer mechanism depicted in Fig. 12 in the transfer position.

A crank pin 129 is fixed to the lower face of the lower disc 128 spaced from the shaft 125 as shown in Fig. 15. A crank pin yoke 130 is mounted on this crank pin and is pivotally connected to the rotating rod 131 which in turn is connected to the operating arm 102 at 132. The operation of this transfer mechanism will be explained later.

A sleeve 133 is mounted in the supporting bearing 87 as shown in Fig. 1, adapted to receive a cam plunger 134, one end of which remains in engagement with the cam face 92. A bell crank 135 is pivoted to the frame at 136 and is pinned to the plunger 134 which follows the cam face 92, and a connecting link 137 in the manner shown. A rocker arm 138 is pivoted to the frame at 139 and an additional rocker arm 140 is pivoted to the frame at 141. One end of each of these rocker arms is pivoted to the connecting link 137 while the other end of the rocker arm 138 is pivoted to the segmental gear 142 and the other end of the rocker arm 140 is pivoted to the segmental gear 143. These rocker arms form the sole support for the segmental gears 142 and 143.

The receiving table consists of a central fixed section 144 and two movable sections 145 disposed on opposite sides of the fixed portion 144, as shown in Fig. 2. Each of these movable portions 145 is provided with a toothed rack on its under side adapted to engage with the teeth of the segmental gears 142 and 143. Since there are two movable portions 145, the segmental gears 142 and 143 are duplicated, the pair of segmental gears 142 being spaced apart and supported by the rocker arm 138, and the pair of segmental gears 143 being spaced apart in like manner and supported by the rocker arm 140. These two pair of segmental gears form the sole support for the movable portions 145 of the receiving table. The segmental gear operating arm 109 is pivoted to the operating arm 102 as explained above and is projected through a hole in the web 27 of the frame as shown in Fig. 1, in a manner such that the other end of this operating arm can be pivotally secured to a projecting portion 146 made integral with the segmental gear 142 on the far side of the machine as shown in Fig. 1. This arm 109 is adapted to operate the segmental gear 142 through an arc to reciprocate the movable portion 145 of the receiving table.

Figures 18, 19:
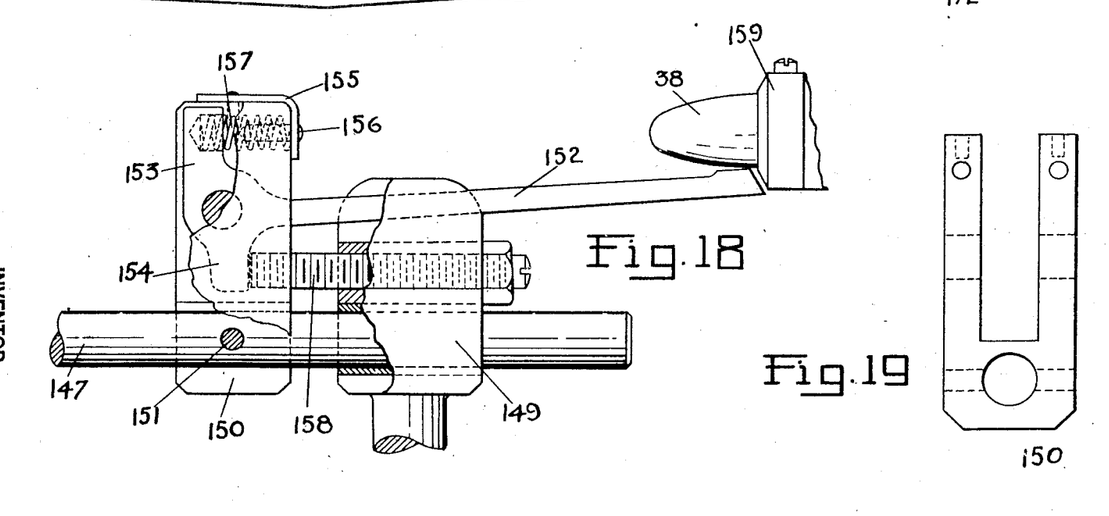
Fig. 18 is a detailed elevational view of the intercepting plate return mechanism, with parts in section and parts broken away.
Fig. 19 is an enlarged end elevational view of the supporting member for the intercepting plate return mechanism.

A rod 147 is linked to one of the movable table portions 145 at 148 as shown in Fig. 2. This rod is supported in a horizontal position by a pair of guide supports 149 in a manner such that they may be freely reciprocated therein. A U-shaped member 150 is fixed to this rod 147 in any suitable manner, such as, for example, by a pin 151 transfixing the shaft 147 and the base of the U-shaped member 150 as shown in Fig. 18. An intercepting plate return arm 152 is pivotally mounted between the upright arms of the U-shaped member 150 and is provded with an upright portion 153 and a stop projection 154. A spring support 155 is fixed to the top of the U-shaped member 150 in any suitable manner and is provided with a horizontally extending pin 156 adapted to be received within a helical spring 157, one end of which seats within a socket in the upright member 153 to hold the return arm 152 in a predetermined position as shown in Fig. 18. A suitable stop member 158 is fixed in the rear support 149 in a position to engage the stop projection 154 on the return arm 152. The end of the return arm 152 is shaped to engage the collar 159 on the end of the stop plunger 38.

The stop plunger 38 is provided with a cylindrical head 160 adapted to slide within the cam sleeve 39. The head 160 is transfixed by a pin 161, the ends of which are disposed within a pair of helical cam slots 162 in the sleeve 39. The cam sleeve 39 is additionally provided with a centrally disposed web 163 adapted to form a supporting base for a helical spring 164 disposed about the plunger 38 enveloped by a sleeve 165 adapted to slide within the cam sleeve 39 as shown in Fig. 6.

The head 160 of the plunger 38 is additionally provided with a notch 166 adapted to receive the nose of a locking member 167 disposed within the casing member 168 formed integrally with the platform 31. This locking member 167 is backed by a helical spring 169 disposed within the casing member 168 and is connected to an operating rod 170 which is pivotally mounted on the lock release arm 78 (see Figs. 6 and 8).

Figure 9:
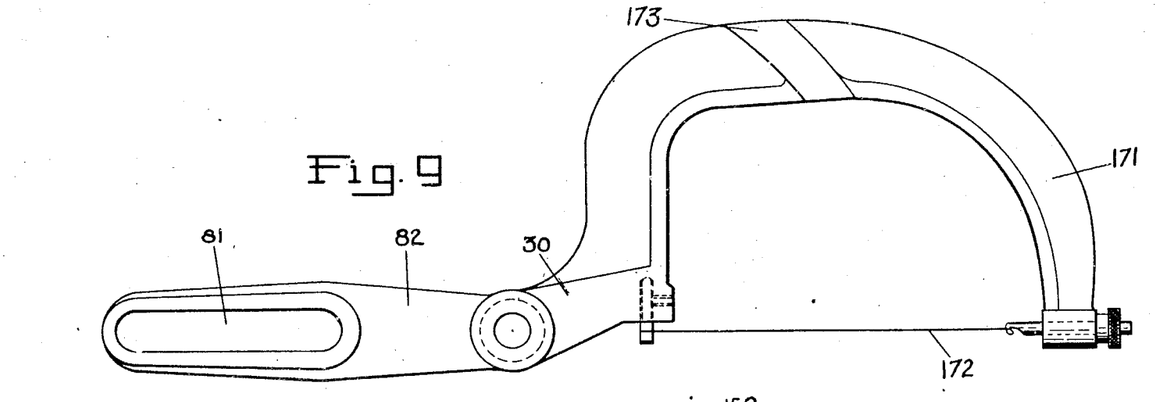
Fig. 9 is an enlarged elevational view of the cutter arm.

The biased cutter 30 comprises an extending arm 82 on which is formed an elongated slot 81 adapted to receive a driving pin 79 fixed to the biased rotary member 69 and a U-shaped cutting wire support 171 provided with any suitable means, such as that shown in Fig. 9, for supporting a tensioned cutter wire 172. The cutting wire support 171 is additionally provided with an arcuate groove 173 adapted to receive an arcuate guide fixed to the guide support 174 in any suitable manner, such as by the screws 175 as shown in Fig. 3. The guide support 174 is preferably formed integral with the cutter guide support 32.

The cutter wire 172 is adapted to operate in an elongated slot 176 formed in the cutter guide support 32, as shown in Fig. 2. The platform 31 is cut away at 177, as shown in Fig. 2, to allow the transfer operation of the transfer disc 123. A pair of guiding plates 178 are suitably mounted on the platform 31 in a manner such that a projected bar of plastic material 179 will be received therebetween, as shown in Fig. 3. The severed portion of the bar of plastic material, which has been termed a "cake" will be referred to by numeral 180 in the following description of the operation of the machine:

In operation a bar 179 of plastic material is extruded from the nozzle 21 by compression. This bar travels over the face of the platform 31 between the guiding plates 178 until it engages the intercepting plate 36 disposed within the path of the extruded bar of plastic material. The intercepting plate 36 is locked in this position by the locking member 167. Further movement of the bar of plastic material will thus cause the platform 31 to move away from the nozzle 21 a predetermined distance governed by the space between the projecting portion 32 of the platform 31 and the supporting member 41. The trip finger 42 is carried with the platform 31 in the direction of the arrow shown in Fig. 5. The nose 43 of the trip finger engages behind the projecting portion 44 of the pivoted arm 45 mounted on the carriage 46, disengaging the stop pin 50 on the striking plate 48. This allows the plate 48 to be rotated in a clockwise direction until it strikes a suitable stop 48' as indicated in Fig. 6, by the spring 51. Upon rotation the striking nose 53 strikes the nose of the trip trigger 54, resulting in a momentary counter-clockwise rotation of the trip arm 55 and the arm 61 through a small angle which raises the locking pawl 64 thereby freeing the biased rotary member 69 as indicated in Fig. 8. This biased rotary member 69 is rotated by the spring 89 through an angle of about 180° until the locking projection 67 in the locking pawl 64 engages with the face of the notch 68'. This movement of the biased rotary member 69 causes the pin 73 to strike the nose 71 of the drive release pawl 70 and swing the latter upwardly which in turn causes the laterally extending arm 72 on the end of this pawl to swing upwardly the trip finger 76 fixed to the pawl shaft 74. The resulting counter-clockwise rotation of the pawl shaft 74 retracts the locking member 167 from its engagement with the head of the stop finger 166 and in addition moves the clutch pawl 77 out of engagement with the pawl stop 94' on the stop disc 94. This allows the continuously rotating collar 95 to rotate the collar 88 to rewind the helical driving spring 89 through the clutch 96 and to rotate the stop disc 94 coupled with the barrel cam 90.

The rotation of the biased rotary member 69 through an angle of approximately 180° reciprocates the biased cutter arm 30 causing the cutter wire 172 to sever a cake 180 from the bar 179 of plastic material. Since the biased rotary member 69 is provided with two stop notches 68 and 68' and two pins 73 and 73', the biased cutter arm is caused to reciprocate forward and back during each complete revolution of the rotary member 69 and to pause after each movement a sufficient period of time to allow the extruded bar of plastic material to move a sufficient distance to engage the intercepting plate 56. The biased cutter arm is thus double acting since it severs two cakes from the bar of plastic material during each complete cycle of reciprocation, the transfer mechanism being operated during each one-half cycle of reciprocation of the cutter arm.

The biased barrel cam 90 is allowed to rotate one complete revolution during each period of operation, the rotation being stopped by the engagement of the clutch pawl 77 with the stop 94' on the stop disc 94 since the pawl shaft 74 has been operated only momentarily by the driving release pawl 70, which was swung upwardly by the impact of the pin 73 against the nose 71. This rotation of the barrel cam 90 initially causes the operating arm 102 to be moved away from the platform 31 in the manner indicated in Fig. 16. This movement of the arm 102 swings the bell crank members 113 in a counter-clockwise direction thereby raising the cradle 117 a predetermined distance limited by the length of the elongated slots 121. When the cradle is so raised the transfer disc 123 engages the bottom of the cake 180 severed from the bar of plastic material. Further movement of the arm 102 moves the carriage 46 along the rods 111 until it is positioned adjacent the end of the receiving table, and in addition rotates the transfer plate 123 through an angle of substantially 90° to place the cake in a position so as to be received on the table in the position indicated in Fig. 1.

The transfer plate 123 is rotated by means of the shaft 125 connected to the lower plate 128 coupled eccentrically to the rotating rod 131 which is pivotally mounted on the operating arm 102. This rotation is caused by the fact that the end of the operating arm 102 on which the arm 115 is pivoted moves through a distance greater than does the other portion of the arm 102 to which the rotating rod 131 is connected, thereby causing the transfer disc 123 to rotate in a clockwise direction until the stop pin 126 engages the edge of the cut away portion 127 in the cradle 117. This position is depicted in Fig. 16. When the operating arm 102 is returned to its initial position by the complete rotation of the barrel cam 90, the transfer carriage and the mechanism thereon are returned to their initial positions by a reversal of the operations described above.

The plunger 134 is retracted by the cam face 92 of the barrel cam 90 when the latter is rotated during the first half of the revolution thereof. This causes the bell crank 135 to lower the connecting link 137 thereby raising the two pairs of segmental gears 142 and 143 mounted on the rocker arms 138 and 140. When the segmental gears are so raised the movable portions 145 of the receiving table are raised into engagement with the series of cakes on the receiving table so that the latter are freed from engagement with the central fixed portion of this table. The segmental gear operating arm 109, being connected to the operating arm 102, rotates the segmental gear 142 in a counter-clockwise direction thereby moving the movable portions 145 away from the cake forming mechanism a distance approximately the width of one cake. The movable portions 145 of the receiving table are thus caused to travel through a four movement cycle during each complete reciprocation of the operating arm 102 or each complete rotation of the barrel cam 90, that is, (1) upwardly into engagement with the cakes disposed on the table, (2) forwardly to move the cakes across the table, (3) downwardly to disengage the movable portion of the table from the cakes and (4) rearwardly to reposition the movable portion of the table for another cycle. The movable portions 145 during their return to their initial positions are allowed to retract from engagement with the cakes by a cut away portion in the cam face 92 which allows the weight of the segmental gears to return the raising mechanisms to their former positions.

When the locking member 167 is disengaged from the notch 166 in the head 160 of the biased plunger 38, the spring 164 causes this stop plunger to travel quickly away from the nozzle. Since the pin 161 in the head of the plunger 38 is disposed in helical cam slots 162 in the cam sleeve 69, the plunger 38 is caused to rotate in a clockwise direction during the longitudinal movement of the plunger 38 in the cam sleeve 39. This action moves the plate 36 out of engagement with the end of the formed cake 180 such that the latter may be transferred to the receiving table by the transfer mechanism. This position of the intercepting plate 36 is shown in Figs. 3, 5 and 6.

Upon return of the movable portions 145 of the receiving table, the intercepting plate return arm 152 is caused to engage the collar 159 on the stop plunger 38 by means of the spring 157, as shown in Fig. 17. When the stop plunger 38 reaches its initial position with the intercepting plate 36 positioned in the path of the extruded bar of plastic material the locking member 167 is caused to engage in the notch 166 in the head of the stop plunger by means of spring 169. The return arm 152 is then disengaged from the collar 159 upon the stop plunger 38 by the engagement of the fixed stop 158 with the stop projection 154 which swings the return arm 152 downwardly, as indicated in Fig. 18. While the transfer carriage 46 is being returned to its initial position the pivot arm 45, mounted on the transfer carriage, engages the stop pin 50 on the plate 48 causing the latter to rotate in a counter-clockwise direction as indicated by the arrow in Fig. 17, to its initial position. The nose 53 of the plate 48 is allowed to pass the trip trigger 54 without operating the trip arm 55 by virtue of the fact that the trip trigger 54 is pivoted to this arm and is normally held in initial position by the spring 57. When the plate 48 is rotated in this counter-clockwise direction, the nose 53 strikes the trip trigger 54 but is allowed to pass by the depression of the nose of this trip trigger which, after passage of the nose 53, will be returned to its initial position by the spring 57. This operation is depicted in Fig. 17.

The entire mechanism except the cutter arm will thus be returned to the initial positions after the transfer of each formed cake to the receiving table so that the operations may be repeated. The cutter arm, however, will travel through only one half of its cycle of operation during one complete operation of the other mechanism in the machine which gives the cutter arm a double cutting action in the manner described above.

The term "biased" as used in the specification and claims is intended to cover the condition of a member having or being connected with stored up energy when held against movement by a locking device so that when it is released the stored up energy will cause the member to move. For example, the rotary member 69 is biased since it is backed by a spring 89 wound up by the collar 88 and is periodically held in a biased condition by cooperation of the stop notches 68 and 68' with the locking projection 67. The cutter arm 30 being connected to the biased rotary member 69 is likewise biased. The barrel cam 90 may also be said to be biased since the continuously rotating friction plate 96 in cooperation with the friction disc 98 continuously tends to rotate the barrel cam through the medium of the stop disc 94 coupled therewith, this rotation being periodically stopped by cooperation of the pawl 77 with the pawl stop 94'.

It will thus be seen that the machine of the present invention efficiently attains the objects set forth above in an admirable manner since the operations of the various mechanisms of the machine are automatically controlled and initiated by the movement of the bar of plastic material ejected from the forming nozzle, the operation of the cutter being performed by a biased cutter, released by mechanism operated by movement of the extruded bar which in turn releases a biased cam adapted to operate the remaining mechanisms.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of langauge, might be said to fall therebetween.

Having described our invention, what we claim as new and desire to secure by Letters Patent, is:

1. In an automatic machine for forming cakes from an extruded bar of plastic material, the combination comprising a double-acting mounted cutting wire adapted periodically to reciprocate through an arc, biased means to operate periodically said mounted cutting wire, means periodically actuated by movement of the bar of plastic material to release said biased operating means upon each periodic actuation, and to carry said cutter along with said moving bar while said cutter is operating, and means to return said cutter to an initial position before each successive cutting operation, said return means being operated by biased mechanism released by said periodically bar actuated means.

2. In an automatic machine for forming cakes from an extruded bar of plastic material, the combination comprising an extruding nozzle, a pivoted cutter arm, a cutting wire mounted on said arm, means to operate said cutter arm including a periodically driven rotary member connected by eccentric means to said cutter arm to reciprocate the latter periodically, a spring fixed to said rotary member, means periodically to store driving energy in said spring and means periodically to hold said rotary member in a biased position during periods of storing energy in said spring, and means actuated by movement of the plastic material from said nozzle to operate said holding means periodically to release said biased rotary member.

3. In an automatic machine for forming cakes from an extruded bar of plastic material, the combination comprising an extruding nozzle, a pivoted cutter arm, a cutting wire mounted on said arm, means to operate said cutter arm including a periodically driven rotary member connected by eccentric means to said cutter arm to reciprocate the latter periodically, a helical spring fixed to said rotary member, a driving shaft, a clutch interposed between said driving shaft and said spring, and means periodically to hold said rotary member in a biased position during periods of operation of said clutch with respect to said spring, means actuated by movement of the plastic material from said nozzle to operate said holding means periodically to release said biased rotary member, and means operated by rotation of said rotary member to release a biased transfer mechanism operating member.

4. In an automatic machine for forming cakes from an extruded bar of plastic material, the combination comprising an extruding nozzle, a cutter arm pivotally mounted for reciprocatory motion through an arc, means to operate said cutter including a biased rotary member to which said cutter arm is eccentrically connected and means in the path of the bar of plastic material extruded from said nozzle and actuated by the movement thereof to release periodically said biased rotary member.

5. In an automatic machine for forming cakes from an extruded bar of plastic material, the combination comprising an extruding nozzle, a cutter arm pivotally mounted for reciprocal movement through an arc, a cutting wire mounted on said arm, means to operate said cutter arm including a biased rotary member to which said cutter arm is eccentrically connected, means periodically to hold said rotary member in one of two biased positions and means actuated by movement of the bar of plastic material from said nozzle periodically to operate said holding means to release said biased rotary member such that the cutter arm moves through one-half of its path of reciprocal motion during each period of rotational motion of said rotary member.

6. In an automatic machine for forming cakes from an extruded bar of plastic material the combination comprising an extruding nozzle, a cutter, means to operate periodically said cutter including a biased rotary member eccentrically connected to said cutter, and means actuated by movement of the bar of plastic material from said nozzle periodically to release said biased rotary member including a platform reciprocally mounted to move with the extruded bar and to carry with it said cutter, a biased intercepting plate mounted on and normally locked with said platform in the path of the extruded bar, a stop device periodically to hold said rotary member in a biased position, mechanism operated by movement of said platform to release said stop device, and means operated by the movement of said rotary member to release periodically said biased intercepting plate to allow it to be carried out of the path of said extruded bar.

7. In an automatic machine for forming cakes from an extruded bar of plastic material the combination comprising an extruding nozzle, a product cutter, means to operate said cutter including a biased rotary member and means actuated by movement of the bar of plastic material from said nozzle periodically to release said biased rotary member including a platform mounted for reciprocal movement on guiding means, a biased rod mounted for reciprocal movement on a portion of said platform, a locking device mounted on said platform in engagement with said biased rod, an intercepting plate mounted on said biased rod in the path of the bar of plastic material extruded from said nozzle, a stop device periodically to hold said rotary member in a biased position, mechanism operated by movement of said platform to release said stop device, and means on said rotary member to cooperate with adjacent means to operate said locking device upon rotational motion of said biased rotary member to allow said intercepting plate to be carried out of the path of the extruded bar.

8. In an automatic machine for forming cakes from an extruded bar of plastic material the combination comprising, an extruding nozzle, a cutter, means to operate said cutter including a biased rotary member, means actuated by movement of the bar of plastic material from said nozzle periodically to release said biased rotary member including a platform mounted for reciprocal movement on guides to move with the extruded bar and to carry with it said cutter, a casing member fixed to said platform, a spiral groove in the wall of said casing, a spring-pressed headed rod mounted for reciprocal movement in said casing, a pin mounted on the head of said rod positioned in said spiral groove, a locking device mounted on said platform in engagement with the head of said rod, an intercepting plate mounted on said rod in the path of the bar of plastic material extruded from said nozzle, a stop device periodically to hold said rotary member in a biased position, mechanism operated by movement of said platform to release said stop device, and means on said rotary member to cooperate with adjacent means to operate said locking device upon rotational motion of said biased rotary member to release said spring-pressed rod.

9. In an automatic machine for forming cakes from an extruded bar of plastic material, the combination comprising a biased cutter mechanism, means to release periodically said biased cutter mechanism, a carriage operated during periods of rest of said cutter to transfer the formed cake of plastic material away from said cutter, biased mechanism to operate said carriage periodically, means actuated by movement of the bar of plastic material periodically to operate said releasing means including means mounted on said carriage, and means to cooperate with said biased cutter mechanism to release said biased carriage operating mechanism when said biased cutter mechanism is allowed to operate.

10. In an automatic machine for forming cakes from an extruded bar of plastic material, the combination comprising a cutter, a biased rotary member to operate said cutter, a carriage operated during periods of rest of said rotary member to transfer the formed cake of plastic material away from said cutter, means actuated by movement of the plastic product periodically to release said biased rotary member including means mounted on said carriage, a table to receive the cut product, means to operate a portion of said table to deliver the formed cake of plastic material from said machine, biased mechanism to operate said carriage and said moving portion of said table, and means to cooperate with said rotary member to release said biased mechanism.

11. In an automatic machine for forming cakes from an extruded bar of plastic material, the combination comprising a cutter, biased means to operate said cutter, a carriage operated during periods of rest of said cutter operating means to transfer the formed cake of plastic material away from said cutter, a platform mounted for reciprocal movement on guides, an intercepting plate mounted for reciprocal movement on said platform in the path of movement of the bar of plastic material, a locking device mounted on said platform to maintain said intercepting plate in position during periods of motion of said platform, mechanism to cooperate with said platform to release said biased operating means upon movement of said platform and to operate said locking device, said mechanism including a member mounted on said carriage, biased mechanism to operate said carriage and a holding device periodically to hold said carriage operating mechanism in a biased position, said holding device being periodically released from engagement with said carriage operating mechanism by the operation of said biased cutter operating means to allow said biased carriage operating mechanism to operate.

12. In an automatic machine for forming cakes from an extruded bar of plastic material, the combination comprising an extruding nozzle, a cutter, means to operate said cutter including a biased rotary member, a carriage operated during periods of rest of said biased rotary member to transfer the formed cake of plastic material away from said cutter, a platform mounted for reciprocal movement on guides to move with the extruded bar and to carry with it said cutter, a biased plunger mounted for reciprocal movement on a portion of said platform, a locking device mounted on said platform in engagement with said plunger, an intercepting plate mounted on said biased plunger in the path of the bar of plastic material extruded from said nozzle, a stop device periodically to hold said rotary member in a biased position, mechanism operated by movement of said platform to release said stop device including a member mounted on said carriage, biased mechanism to operate said carriage, and means on said biased rotary member to cooperate with adjacent means to operate said locking device to allow said intercepting plate to move out of the path of the extruded bar after severance of the cake and to release said biased mechanism upon rotational motion of said rotary member.

13. In an automatic machine for forming cakes from an extruded bar of plastic material, the combination comprising an extruding nozzle, a cutter, means to operate said cutter including a biased rotary member, a receiving table including a portion mounted on actuating means for reciprocal movement operated to deliver the formed cake of plastic material away from said machine, a carriage operated during periods of rest of said rotary member to transfer the formed cake from said cutter to said table, means actuated by movement of the bar of plastic material from said nozzle periodically to release said biased rotary member including a platform mounted for reciprocal movement on guiding means, a cam sleeve fixed to said platform, a spiral groove in the wall of said cam sleeve, a spring-pressed plunger mounted for reciprocal movement in said casing a pin mounted on the head of said plunger positioned in said spiral groove, a locking device mounted on said platform in engagement with the head of said plunger, an intercepting plate mounted on said plunger in the path of the bar of plastic material extruded from said nozzle, a stop device periodically to hold said rotary member in a biased position and mechanism operated by movement of said platform to operate said stop device including a mounted member on said carriage, biased mechanism to operate said carriage and said movable table portion, means on said biased rotary member to cooperate with adjacent means to operate said locking device to release said spring-pressed plunger and to release said biased mechanism upon rotational motion of said rotary member and a device on said movable table portion to return said plunger to a biased locked position.

14. In an automatic machine for forming cakes from an extruded bar of plastic material, carriage guiding means, a carriage mounted for reciprocal movement on said guiding means, a platform on said carriage adapted to be raised to engage a formed cake of plastic material and means periodically to operate said carriage.

15. In an automatic machine for forming cakes from an extruded bar of plastic material, carriage guiding means, a carriage mounted for reciprocal movement on said guiding means, a platform on said carriage adapted to engage a formed cake of the plastic material, means pivoted to said carriage and said platform to raise the latter, and an operating arm linked to said means to reciprocate said carriage and to operate said platform simultaneously.

16. In an automatic machine for forming cakes from an extruded bar of plastic material, a rod, a carriage mounted for reciprocal movement on said rod, a cradle, a rotatable disc supported by said cradle, means mounted on said carriage pivoted to said cradle to raise the latter, an operating arm linked to said means to reciprocate said carriage and raise said cradle simultaneously and means associated with said operating arm to rotate said disc through a predetermined angle.

17. In an automatic machine for forming cakes from an extruded bar of plastic material, a rod, a carriage mounted for reciprocal movement on said rod, a cradle, a rotatable disc supported by said cradle, means mounted on said carriage pivoted to said cradle to raise the latter, an operating arm linked to said raising means to reciprocate said carriage and raise said cradle simultaneously, means associated with said operating arm to rotate said disc through a predetermined angle, a cake receiving table including a movable portion, and means linked to said operating arm to reciprocate said movable table portion.

18. In an automatic machine for forming cakes from an extruded bar of plastic material, a rod, a carriage mounted for reciprocal movement on said rod, a cradle, a rotatable disc supported by said cradle, means mounted on said carriage pivoted to said cradle to raise the latter, an operating arm linked to said raising means to reciprocate said carriage and raise said cradle simultaneously, means associated with said operating arm to rotate said disc through an angle of about 90°, a cake receiving table including a movable portion, a rack mounted on said movable portion, a divided segmental gear in engagement with said rack, supporting means to which said segmental gear is pivoted, means periodically to raise and lower said supporting means and means connected with said operating arm to operate said segmental gear to reciprocate said movable table portion.

19. In an automatic machine for forming cakes from an extruded bar of plastic material, a rod, a carriage mounted for reciprocal movement on said rod, a cradle, a rotatable disc supported by said cradle, means mounted on said carriage pivoted to said platform to raise the latter, an operating arm linked to said means to reciprocate said carriage and raise said cradle simultaneously, means associated with said operating arm to rotate said disc through an angle of about 90°, a cake receiving table including a movable portion, a rack mounted on said movable portion, divided segmental gears in engagement with said rack, supporting means to which said segmental gears are pivoted, means periodically to raise and lower said supporting means, means connected with said operating arm to operate one of said segmental gears to reciprocate said movable table portion, a biased barrel cam having two cam follower tracks, one of which is adapted to operate said operating arm and the other of which is adapted to operate said raising and lowering means, a continuously rotating driving shaft and a periodically operated clutch mounted between said rotating shaft and said biased barrel cam to operate the latter from the former.

In testimony whereof we affix our signatures.

GERHARDT J. PATITZ.
RALPH W. BUNGE.